US009125024B2

(12) United States Patent
Hua et al.

(10) Patent No.: US 9,125,024 B2
(45) Date of Patent: Sep. 1, 2015

(54) BROADCASTING AVAILABILITY OF FREE INTERNET ACCESS AT WIRELESS ACCESS POINTS

(75) Inventors: Suzann Hua, Lisle, IL (US); Ahmed N. Zaki, Lisle, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 466 days.

(21) Appl. No.: 13/218,119

(22) Filed: Aug. 25, 2011

(65) Prior Publication Data

US 2013/0051299 A1 Feb. 28, 2013

(51) Int. Cl.
| | |
|---|---|
| *H04L 12/28* | (2006.01) |
| *H04W 4/06* | (2009.01) |
| *H04W 48/10* | (2009.01) |
| *H04L 12/18* | (2006.01) |
| *G06Q 30/02* | (2012.01) |
| *H04J 1/16* | (2006.01) |
| *H04W 4/20* | (2009.01) |
| *H04W 84/12* | (2009.01) |
| *H04W 88/08* | (2009.01) |

(52) U.S. Cl.
CPC .............. *H04W 4/06* (2013.01); *G06Q 30/0241* (2013.01); *H04L 12/1845* (2013.01); *H04W 48/10* (2013.01); *H04W 4/206* (2013.01); *H04W 84/12* (2013.01); *H04W 88/08* (2013.01)

(58) Field of Classification Search
USPC .......................... 370/254, 329, 338, 389, 386
See application file for complete search history.

(56) References Cited

U.S. PATENT DOCUMENTS

| | | | | |
|---|---|---|---|---|
| 8,831,660 | B2 * | 9/2014 | Jonker et al. .................. | 455/517 |
| 2006/0059043 | A1 * | 3/2006 | Chan et al. ..................... | 705/14 |
| 2007/0213029 | A1 * | 9/2007 | Edney et al. ............... | 455/404.1 |
| 2008/0276303 | A1 * | 11/2008 | Gast ................................. | 726/3 |
| 2008/0298333 | A1 * | 12/2008 | Seok ............................ | 370/338 |
| 2010/0091732 | A1 * | 4/2010 | Roeder et al. ................. | 370/331 |
| 2010/0106572 | A1 * | 4/2010 | van Hoff et al. ............. | 705/14.4 |
| 2010/0150118 | A1 * | 6/2010 | Daum .......................... | 370/338 |
| 2010/0296441 | A1 * | 11/2010 | Barkan ......................... | 370/328 |
| 2011/0314525 | A1 * | 12/2011 | Ptasinski et al. .................. | 726/5 |
| 2012/0178488 | A1 * | 7/2012 | Jonker et al. .................. | 455/517 |

* cited by examiner

*Primary Examiner* — John Pezzlo
(74) *Attorney, Agent, or Firm* — Duft Bornsen & Fettig, LLP

(57) ABSTRACT

Systems and methods are provided for broadcasting internet availability at a Wireless Access Point (WAP). The system is operable to process the memory to determine whether the WAP provides free internet access to wireless devices, and to generate a management frame for the WAP. The system is further operable to insert data indicating whether the WAP provides the free internet access into the management frame, and to broadcast the management frame via the WAP for receipt by wireless devices within range of the WAP.

20 Claims, 7 Drawing Sheets

BROADCASTING AVAILABILITY OF FREE INTERNET ACCESS AT WIRELESS ACCESS POINTS

FIELD OF THE INVENTION

The invention relates to the field of wireless communications, and in particular, to notifications in wireless networks.

BACKGROUND

Wireless networks are becoming increasingly popular in the digital age. An example of such a network includes a Wireless Local Area Network (WLAN) in compliance with IEEE 802.11b/g/n standards. Users of a wireless network typically use a Wireless Access Point (WAP) to initiate communications with the network and access an internet (e.g., the global Internet). As WAP hot spots have become prevalent in public spaces (e.g., coffee shops, libraries, public streets, and book stores), users have begun to seek out and utilize those hot spots that offer internet access. Businesses have attempted to capitalize on the public's desire for internet by displaying advertisements at the welcome pages of hot spots that provide free internet services.

Typically, in order to find a hot spot offering free internet access, a customer unlocks their wireless device and places it into an active mode. The device acquires the identity of nearby WAPs by listening for management frames transmitted by those WAPs. The user then selects a WAP, and the wireless device can attempt to utilize the WAP to access a specific web page or site. If the attempt is successful, the home page of the website is transmitted by the WAP and the user views it. However, if the attempt is unsuccessful, the wireless device may be notified by the WAP that internet access is not available unless payment is supplied.

SUMMARY

Embodiments described herein include Wireless Access Points (WAPs) that actively transmit the availability of free internet access within management frames that are transmitted to wireless devices. These management frames may be transmitted to wireless devices without any prompting from the wireless devices, and may be used to initiate communication with the WAP. Thus, wireless device users have no need to try to connect to a WAP in order to determine if it provides free internet access. This in turn allows users of wireless devices to more quickly and efficiently determine the availability of free internet access (including, for example, free access to one or more web sites).

One embodiment is a system comprising a controller for a Wireless Access Point (WAP) and a memory. The controller is operable to process the memory to determine whether the WAP provides free internet access to wireless devices, and to generate a management frame for the WAP. The controller is further operable to insert data indicating whether the WAP provides the free internet access into the management frame, and to broadcast the management frame via the WAP for receipt by wireless devices within range of the WAP.

Another embodiment is a method of managing a wireless network. The method comprises processing a memory to determine whether a Wireless Access Point (WAP) provides free internet access to wireless devices, and generating a management frame for the WAP. The method further comprises inserting data indicating whether the WAP provides free internet access to wireless devices into the management frame, and broadcasting the management frame via the WAP for receipt by wireless devices within range of the WAP.

Another embodiment is a wireless device comprising an antenna and a processor. The antenna is operable to receive a management frame transmitted by a Wireless Access Point (WAP) of a wireless network. The processor is operable to process the management frame to identify a field inserted into the management frame and to process the field to determine whether the WAP provides free internet access to wireless devices. The processor is further operable to generate a message based upon the management frame, and to alert a user of a wireless device of the free internet access.

Other exemplary embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
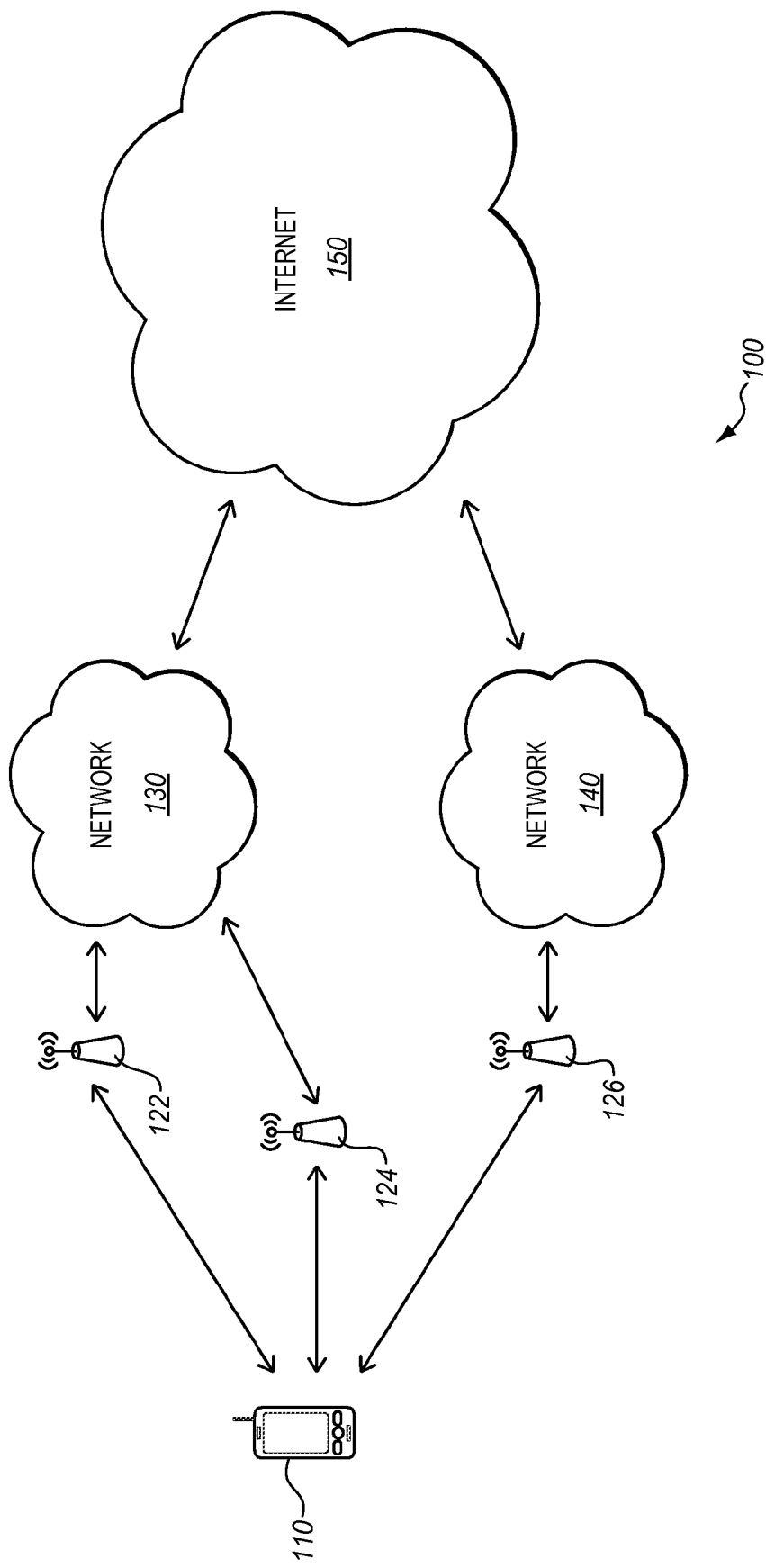
FIG. 1 is a block diagram of a network architecture in an exemplary embodiment.

FIG. 1 is a block diagram of a network architecture 100 in an exemplary embodiment. Network architecture 100 comprises any systems, devices, and/or components for initiating and facilitating communications between wireless devices and an internet. In this embodiment, network architecture 100 comprises wireless device 110, Wireless Access Points (WAPs) 122-126, networks 130-140, and internet 150. Note that the number of WAPs, networks, and wireless devices presented in FIG. 1 is arbitrary and may vary depending upon preferred implementation. Wireless device 110 may comprise any device capable of initiating communications over a wireless protocol. For example, wireless device 110 may be compliant with the Institute of Electrical and Electronics Engineers (IEEE) 802.11, IEEE 802.11(b), IEEE 802.11(g), and/or IEEE 802.11(n) protocols. Wireless device 110 may comprise a mobile device such as a smartphone, tablet, laptop, etc. WAPs 122-126 comprise access points operable to facilitate communications with wireless device 110 over an air interface in accordance with a wireless protocol. WAPs 122-126 may further be operable to translate, wrap, or tunnel communications with wireless device 110 in order to facilitate communication between wireless device 110 and networks 130-140 and/or internet 150. Networks 130-140 comprise computer networks in communication with internet 150, and internet 150 may comprise the Internet (the global system of interconnected computer networks that use the Internet Protocol (IP) Suite to communicate with each other) or another internet (e.g., a private, internal network). Note that internet 150 may include web pages or other components available for access by a browser of wireless device 110.

While network architecture 100 is in operation, wireless device 110 may establish communications over an air interface with any of WAPs 122-126. WAPs 122-124 and 126 establish communications with networks 130 and 140, respectively, and networks 130-140 establish communications with internet 150. In this manner, wireless device 110 establishes communications with internet 150.

Before proceeding further, it is important to understand how traditional networks establish communications with a wireless device. These communications will be described with regard to FIG. 2. Assume, for this embodiment, that a user of wireless device 110 is searching for a WAP that provides access to internet 150 free of charge.

Figure 2:
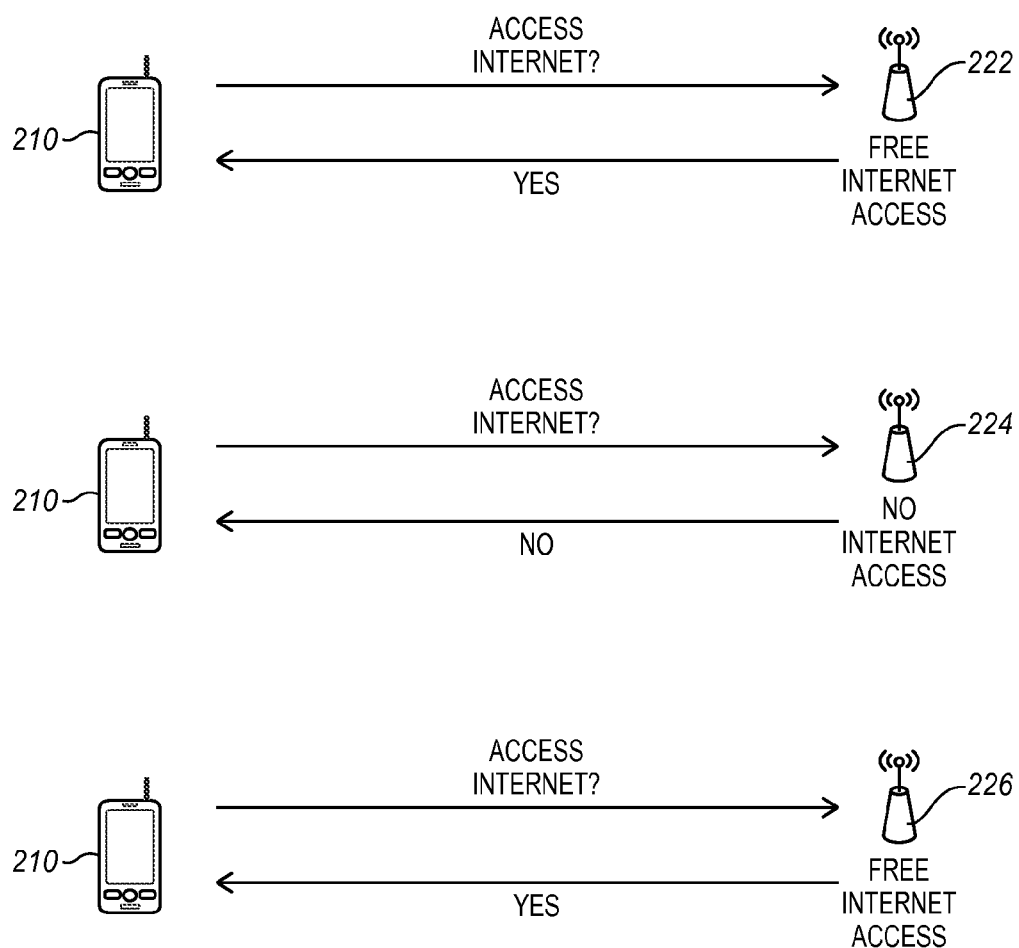
FIG. 2 is a block diagram illustrating traditional communications between a wireless device and a Wireless Access Point (WAP).

FIG. 2 is a block diagram illustrating traditional communications between a wireless device 210 and a Wireless Access Point (WAP). According to FIG. 2, a user of wireless device 210 first activates their device and identifies available Wireless Access Points (WAPs) 222-226. Available WAPs may be discovered when wireless device 210 listens for management frames that are broadcast by nearby WAPs. A management frame is a signal, broadcast by a WAP, that identifies the capabilities and existence of the WAP. Management frames provide information allowing a wireless device to initiate contact with the WAP and, for example, establish a communication channel. As soon as the available WAPs are discovered, the user may manually attempt to connect to each WAP in order to determine whether the WAP offers free internet access to wireless devices. However, wireless device 210 must attempt acquire internet data from each WAP in order to determine whether the WAP offers free internet access. This process is time-intensive, bandwidth-intensive, and also processing intensive. In contrast, utilizing the system of FIG. 1 and its associated functionally enhanced wireless device 110 and WAPs 122-126, a wireless device may automatically detect the presence of free internet services without having to query each WAP known to be available. This is because wireless device 110 is capable of processing enhanced management frames transmitted by WAPs 122-126 and determining, based upon the enhanced management frames, whether free internet access (i.e., internet access provided free of charge or payment) is available.

Figure 3:
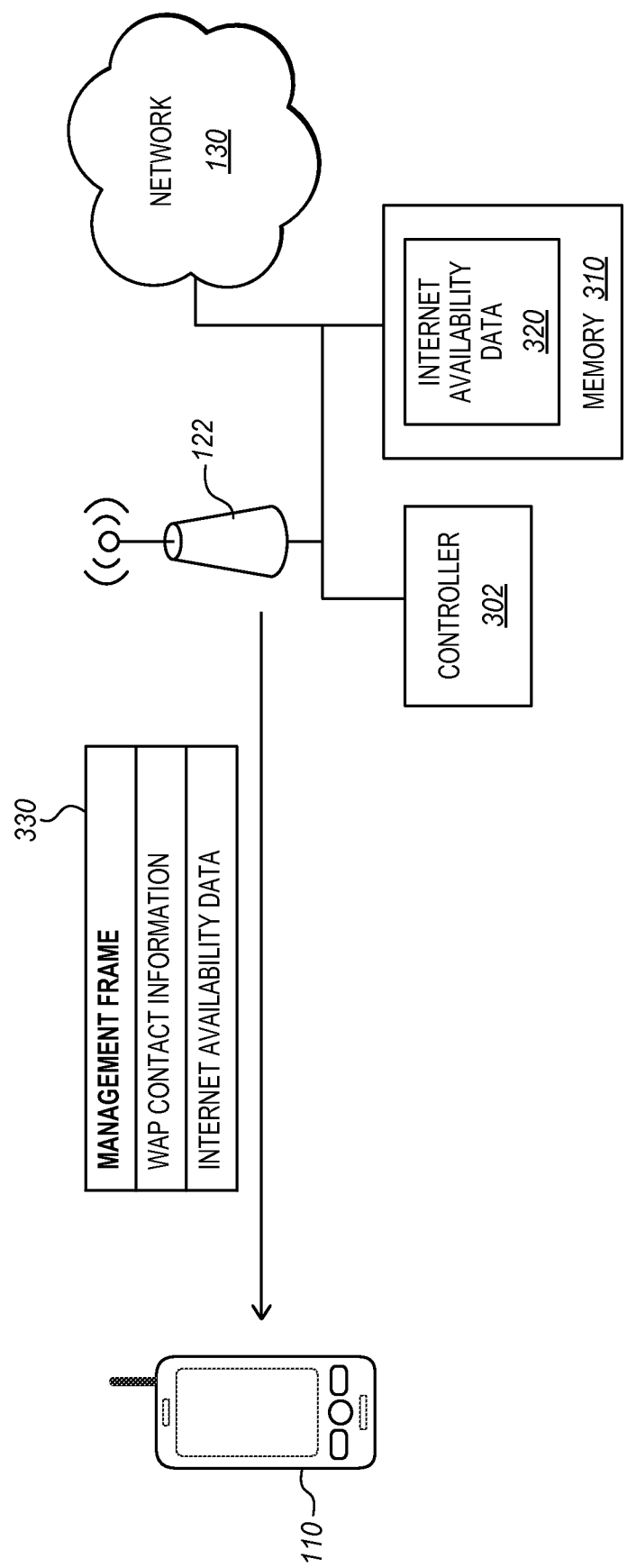
FIG. 3 is a block diagram illustrating a network architecture utilizing an enhanced management frame for a Wireless Access Point (WAP) in an exemplary embodiment.

FIG. 3 is a block diagram illustrating a network architecture 100 utilizing an enhanced management frame 330 for a Wireless Access Point (WAP) 122 in an exemplary embodiment. In this embodiment, WAP 122 is operated by a controller 302 operable to access a memory 310 that includes internet availability data 320. Controller 302 may be integrated into WAP 122, or may be an independent component that is separate from WAP 122. Internet availability data 320 includes any information that describes whether internet 150 can be accessed free of charge by wireless devices connecting to WAP 122. Internet availability data 320 may further comprise information describing whether the global Internet is available via internet 150. Memory 310 may be a part of WAP 122 or network 130, or may be independent of both. Once controller 302 has accessed memory 310, controller 302 is capable of generating an enhanced management frame 330, based on internet availability data 320. Enhanced management frame 330 may then be broadcast from WAP 122. Enhanced management frame 330 includes contact information for WAP 122, along with information indicating whether WAP 122 provides free access to internet 150. Enhanced management frame 330 may further indicate whether the global Internet is available via internet 150. Upon acquiring enhanced management frame 330 from a variety of WAPs, wireless device 110 may determine the availability of free internet at various WAPs without a need to individually query each WAP.

Figure 4:
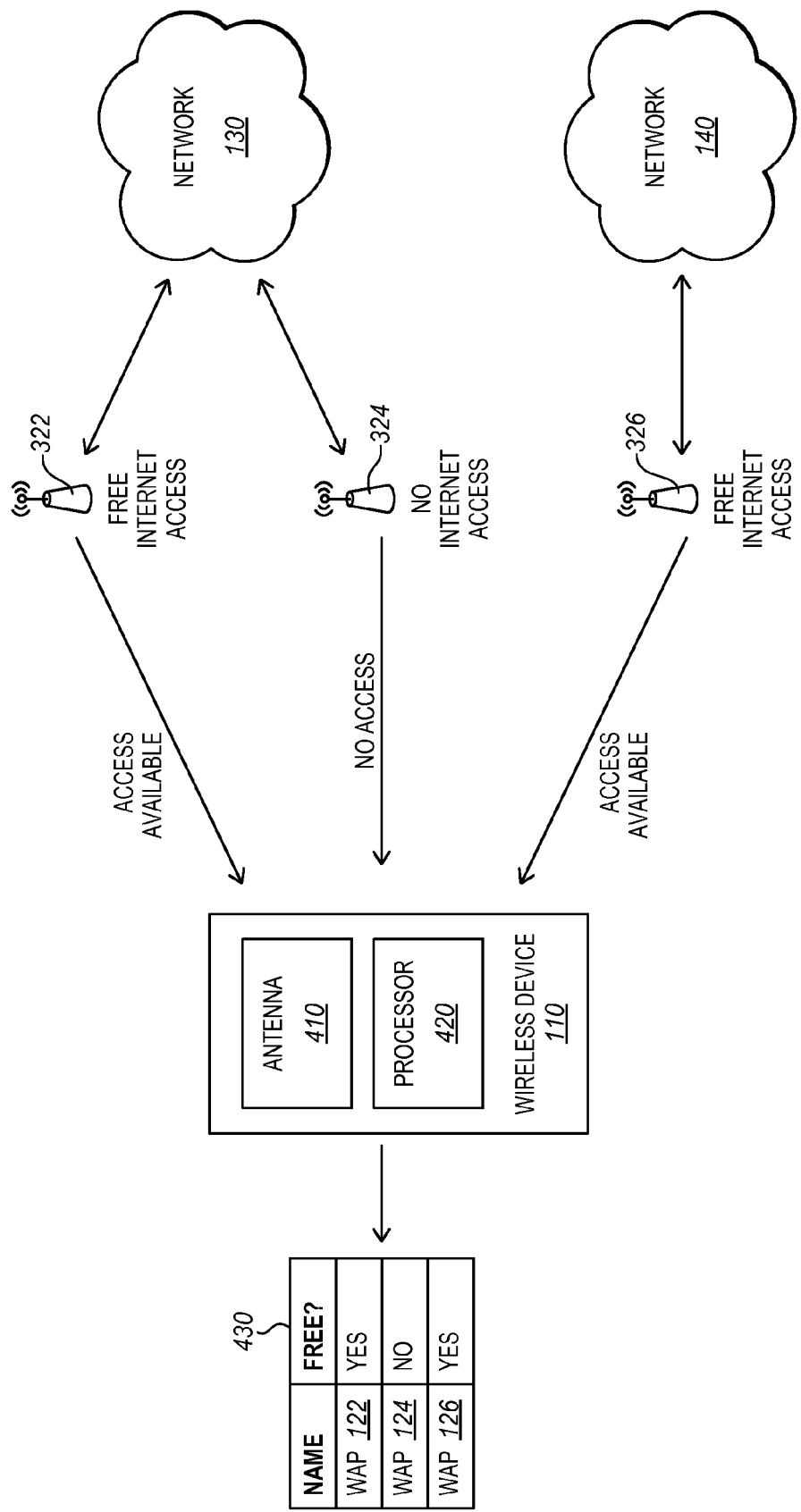
FIG. 4 is a block diagram illustrating the use of enhanced management frames in a wireless network in an exemplary embodiment.

FIG. 4 is a block diagram illustrating the use of enhanced management frames in a wireless network in an exemplary embodiment. According to FIG. 4, wireless device 110, comprising an antenna 410 and a processor 420, communicates with WAPs 122-126. Upon acquiring enhanced management frames from each of WAPs 122-126 via antenna 410, processor 420 of wireless device 110 may generate an availability list 430 that describes the availability of free internet 150 via each of WAPs 122-126. Wireless device 110 may present availability list 430 to a user, and the user may select a WAP, understanding before initiating contact that this WAP does or does not provide internet access.

Further details of the operation of WAPs 122-126 will be discussed with regard to FIG. 5, although only WAP 122 is specifically described. Assume, for this embodiment, that controller 302 for WAP 122 is in the process of initializing in order to provide wireless services.

Figure 5:
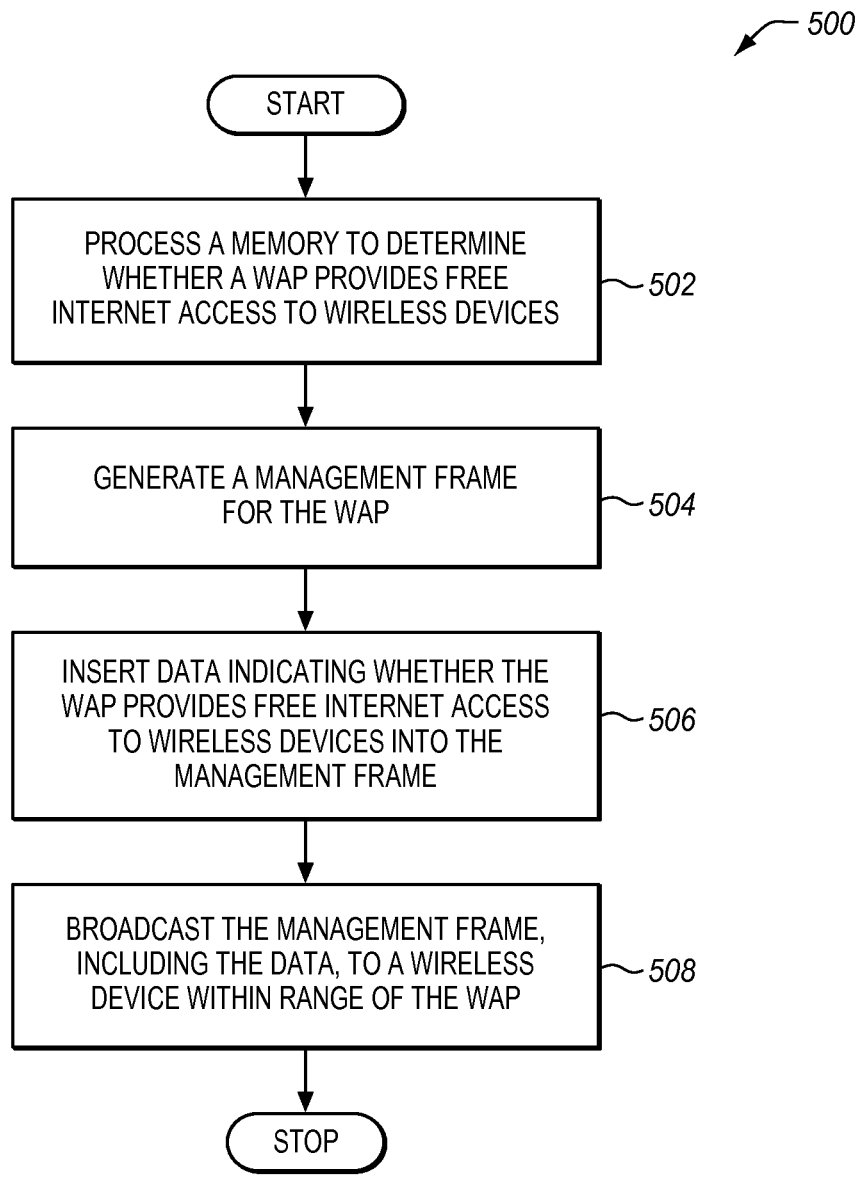
FIG. 5 is a flowchart illustrating a method of utilizing an enhanced management frame at a WAP of a wireless network in an exemplary embodiment.

FIG. 5 is a flowchart illustrating a method 500 of utilizing an enhanced management frame at a WAP of a wireless network in an exemplary embodiment. The steps of method 500 are described with reference to network architecture 100 of FIG. 1, but those skilled in the art will appreciate that method 500 may be performed in other systems. The steps of the flowcharts described herein are not all inclusive and may include other steps not shown. The steps described herein may also be performed in an alternative order. In step 502, controller 302 for WAP 122 processes memory 310 to identify data indicating whether WAP 122 provides internet access free of charge to wireless devices. In step 504, controller 302 generates management frame 330 based on the data. Management frame 330 comprises, for example, information allowing a wireless device to identify and contact WAP 122.

In step 506, controller 302 inserts data indicating whether WAP 122 provides free internet access to wireless devices into management frame 330. For example, controller 302 may directly copy the data into management frame 330, or may process the data and then set a bit or octet of management frame 330 (or a field thereof) in order to indicate the availability of internet 150 (and, for example, whether the global Internet is available via internet 150). In some embodiments, the availability of internet indicated in memory 310 may vary with the type of wireless device, time of day, network load, type of internet service requested (e.g., streaming video, web pages, microblogging, etc.) or other variables. Controller 302 may therefore add further details to management frame 330 in order to clarify the exact nature of the internet access. Further, in some embodiments, controller 302 may be programmed to provide advertisements such as business offerings to wireless devices accessing the internet. An example of such an advertisement may include a coupon or offer to provide business services, placed on a welcome page for wireless devices accessing internet 150 through WAP 122. In such circumstances, controller 302 may integrate information indicating that a promotional offer is available into management frame 330. In step 508, controller 302 broadcasts management frame 330 via WAP 122 for receipt by wireless devices within range of WAP 122. Management frame 330 may be broadcast at regular intervals, and the broadcast of management frame 330 need not be triggered by a request from a wireless device.

Figure 6:
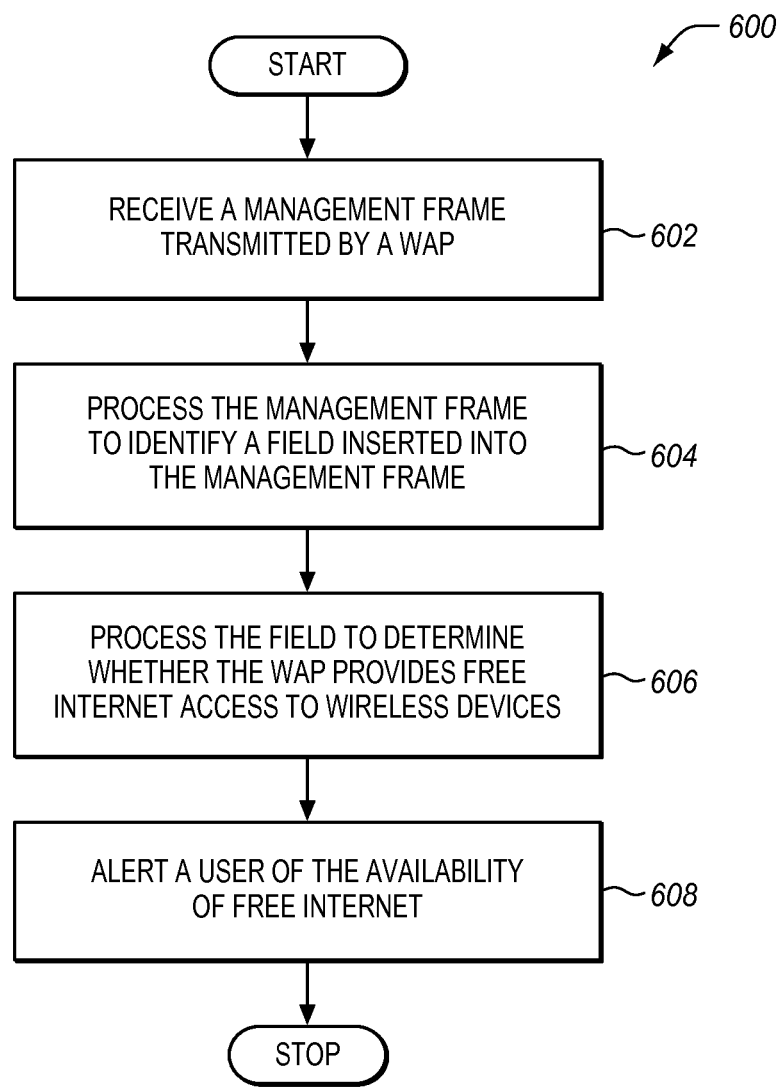
FIG. 6 is a flowchart illustrating a method of processing an enhanced management frame from a WAP at a wireless device in an exemplary embodiment.

FIG. 6 is a flowchart illustrating a method 600 of processing an enhanced management frame from a WAP 122 at a wireless device 110 in an exemplary embodiment. The steps of method 600 are described with reference to the network architecture of FIG. 4, but those skilled in the art will appreciate that method 600 may be performed in other systems. According to FIG. 6, in step 602 wireless device 110 receives management frame 330 transmitted by WAP 122. In step 604, processor 420 of wireless device 110 processes management frame 330 to identify a field inserted by into management frame 330. This field may comprise, for example, a new field not defined by a standard relating to management frame 330, or an enhanced field having additional parameters. In step 606, processor 420 processes the field to determine whether WAP 122 provides free internet access to wireless devices (and, for example, whether the access to internet 150 includes access to the global Internet). If WAP 122 provides such internet access, processor 420 may notify a user of wireless device 110 (e.g., via a text message, audible notification, vibration, or display on a user interface). In step 608, processor 420 instructs a user interface to alert a user of wireless device 110 that internet 150 is available free of charge. This alert may comprise, for example, a vibration, a sound or sequence of sounds, a text message, e-mail, or an on-screen alert at wireless device 110. Processor 420 may further generate a message based upon management frame 330. This message may be designed to set up a communication channel between wireless device 110 and WAP 122. Using this message, wireless device 110 may initiate contact with WAP 122 via antenna 410.

EXAMPLE

In the following example, additional processes, systems, and methods are described in the context of an IEEE 802.11b wireless network.

Figure 7:
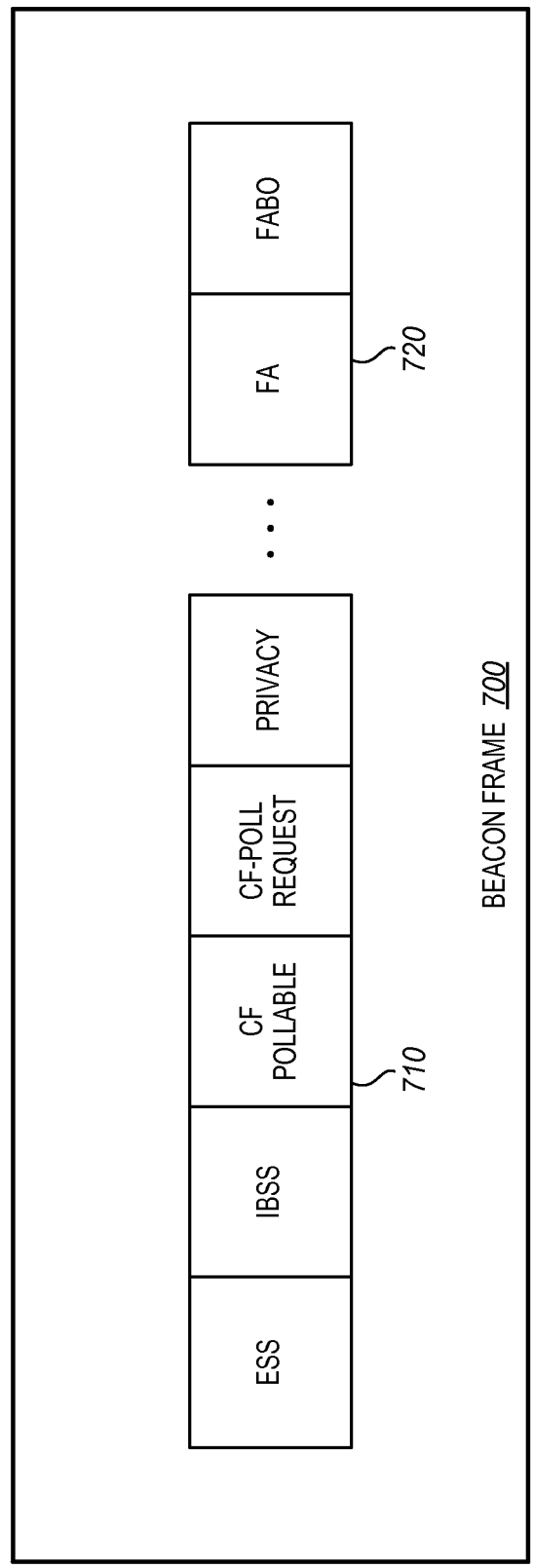
FIG. 7 is a block diagram illustrating an enhanced management frame in an exemplary embodiment.

FIG. 7 is a block diagram illustrating an enhanced management frame in an exemplary embodiment. In this embodiment, the management frame comprises Beacon frame 700, in compliance with IEEE 802.11b standards. Beacon frame 700 comprises a standard Capability Information field in accordance with IEEE 802.11b standards, and further comprises an enhanced additional portion 720 of the Capability Information field. This enhanced additional portion 720 includes a Free Access (FA) bit indicating the availability of free internet, and further includes a Free Access with Business Offering (FABO) bit indicating whether the free internet access includes an advertisement/promotional offer.

A Wireless Access Point (WAP) may periodically broadcast Beacon frame 700 at a regular interval in order to inform various wireless devices of its availability. When the wireless devices parse Beacon frame 700, they may quickly determine the availability of free internet without needing to query the WAP. This provides a further benefit because it does not tie up scarce WAP air interface resources on such queries. If a wireless device determines that the FABO bit is set, the wireless device may generate and transmit a query to the WAP in order to get further details on the business offering/advertisement.

Any of the various elements shown in the figures or described herein may be implemented as hardware, software, firmware, or some combination of these. For example, an element may be implemented as dedicated hardware. Dedicated hardware elements may be referred to as "processors," "controllers," or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. The scope of the invention is defined by the following claims and any equivalents thereof.

We claim:

1. A system, comprising:
a controller for a Wireless Access Point (WAP) wherein the WAP is operable to engage in wireless communications according to at least one of the Institute of Electrical and Electronics Engineers (IEEE) 802.11 protocols; and
a memory;
the controller operable to process the memory to determine whether the WAP provides free internet access to wireless devices, to generate a Beacon frame for the WAP, to insert a bit into a Capability Information field of the Beacon frame indicating whether the WAP provides free internet access, and to broadcast the Beacon frame via the WAP for receipt by wireless devices within range of the WAP,
wherein the controller is operable to insert the bit as a custom portion of the Capability Information field that is not defined by IEEE 802.11 protocols.

2. The system of claim 1, wherein:
the controller is further operable determine whether the internet access includes access to the global Internet, and to insert data indicating whether the internet access includes access to the global Internet into the Beacon frame.

3. The system of claim 1, wherein:
the controller is further operable to insert an identifier (ID) for the WAP and information for establishing contact with the WAP into the Beacon frame, and to broadcast the Beacon frame via the WAP without receiving a transmission from a wireless device requesting a Beacon frame.

4. The system of claim 1, wherein:
the controller is further operable to insert an additional bit into the Capability Information field of the Beacon frame indicating whether the WAP provides free internet access that includes an advertisement.

5. The system of claim 4, wherein:
the controller is further operable to store the advertisement, and to include the advertisement on a web page presented to wireless devices that access the WAP.

6. The system of claim 1, wherein:
the custom portion comprises an additional portion of the Capability Information field.

7. The system of claim 1, wherein:
the memory is further operable to store data for an advertisement relating to an operator of the WAP; and
the controller is further operable to insert data indicating the advertisement relating to the operator of the WAP into the Beacon frame.

8. A method of managing a wireless network, comprising:
processing a memory to determine whether a Wireless Access Point (WAP), operable to engage in wireless communications according to at least one of the Institute of Electrical and Electronics Engineers (IEEE) 802.11 protocols, provides free internet access to wireless devices; and
generating a Beacon frame for the WAP;
inserting a bit into a Capability Information field of the Beacon frame indicating whether the WAP provides free internet access to wireless devices, wherein the bit is inserted as a custom portion of the Capability Information field that is not defined by IEEE 802.11 protocols;
broadcasting the Beacon frame via the WAP for receipt by wireless devices within range of the WAP.

9. The method of claim 8, further comprising:
determining whether the internet access includes access to the global Internet; and
inserting data indicating whether the internet access includes access to the global Internet into the Beacon frame.

10. The method of claim 8, further comprising:
inserting an identifier (ID) for the WAP and information for establishing contact with the WAP into the Beacon frame; and
broadcasting the Beacon frame via the WAP without receiving a transmission from a wireless device requesting a Beacon frame.

11. The method of claim 8, further comprising:
inserting an additional bit into the Capability Information field of the Beacon frame indicating whether the WAP provides free internet access that includes an advertisement.

12. The method of claim 11, further comprising:
storing the advertisement at the WAP; and
including the advertisement on a web page presented to wireless devices that access the WAP.

13. The method of claim 8, wherein:
the custom portion comprises an additional portion of the Capability Information field.

14. The method of claim 8, wherein:
determining that an advertisement relating to an operator of the WAP is available; and
inserting data indicating the advertisement relating to the operator of the WAP into the Beacon frame.

15. A wireless device comprising:
an antenna operable to receive a Beacon frame transmitted by a Wireless Access Point (WAP) of a wireless network that engages in wireless communications according to at least one of the Institute of Electrical and Electronics Engineers (IEEE) 802.11 protocols; and
a processor operable to process the Beacon frame to identify a Capability Information field, to process the Capability Information field to detect a bit indicating whether the WAP provides free internet access, wherein the bit comprises a custom portion of the Capability Information field that is not defined by IEEE 802.11 protocols, to generate a message based upon the Beacon frame, and to alert a user of the wireless device whether free internet access is provided by the WAP.

16. The wireless device of claim 15, wherein:
the processor is further operable to process the Capability Information field of the Beacon frame to determine whether the internet access includes access to the global Internet.

17. The wireless device of claim 15, wherein:
the processor is further operable to process the Capability Information field of the Beacon frame to determine that an advertisement relating to an operator of the WAP is available.

18. The wireless device of claim 17, wherein:
the processor is further operable to generate a request for the advertisement, and to direct the antenna to transmit the request.

19. The wireless device of claim 15, wherein:
the processor is further operable to process the Capability Information field to detect an additional bit indicating whether the WAP provides free internet access that includes an advertisement.

20. The wireless device of claim 15, wherein:
the custom portion comprises an additional portion of the Capability Information field.

* * * * *